May 14, 1940.  W. T. PERKINS ET AL  2,200,637
PROJECTOR
Filed May 11, 1939
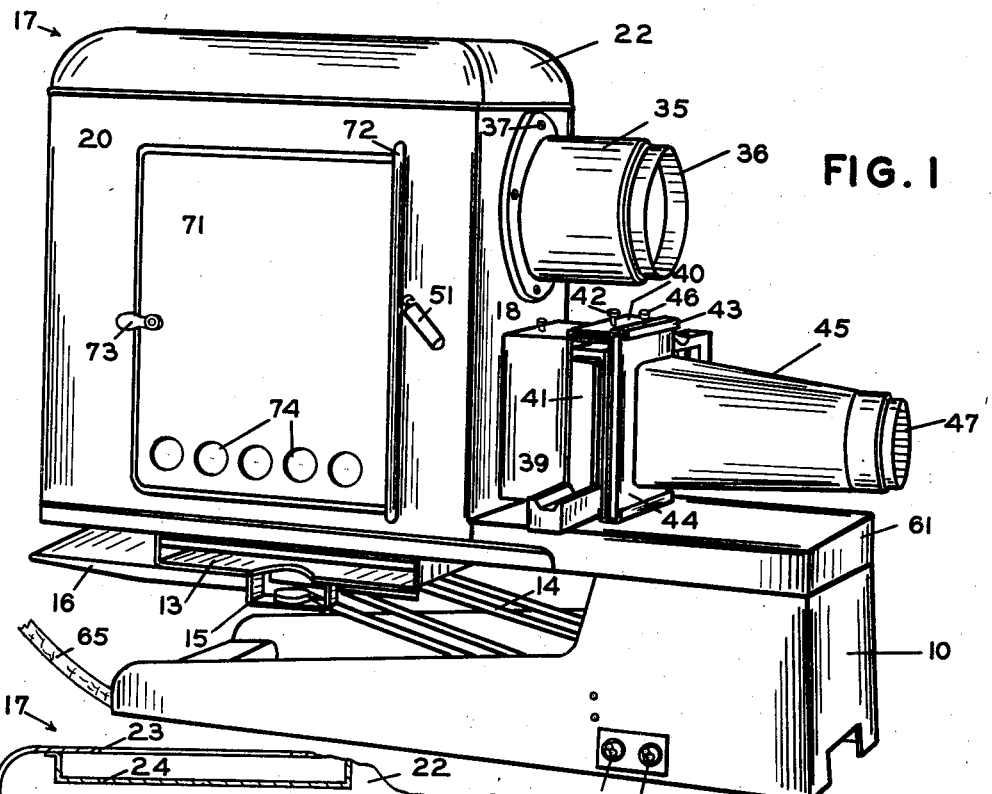
FIG. 1
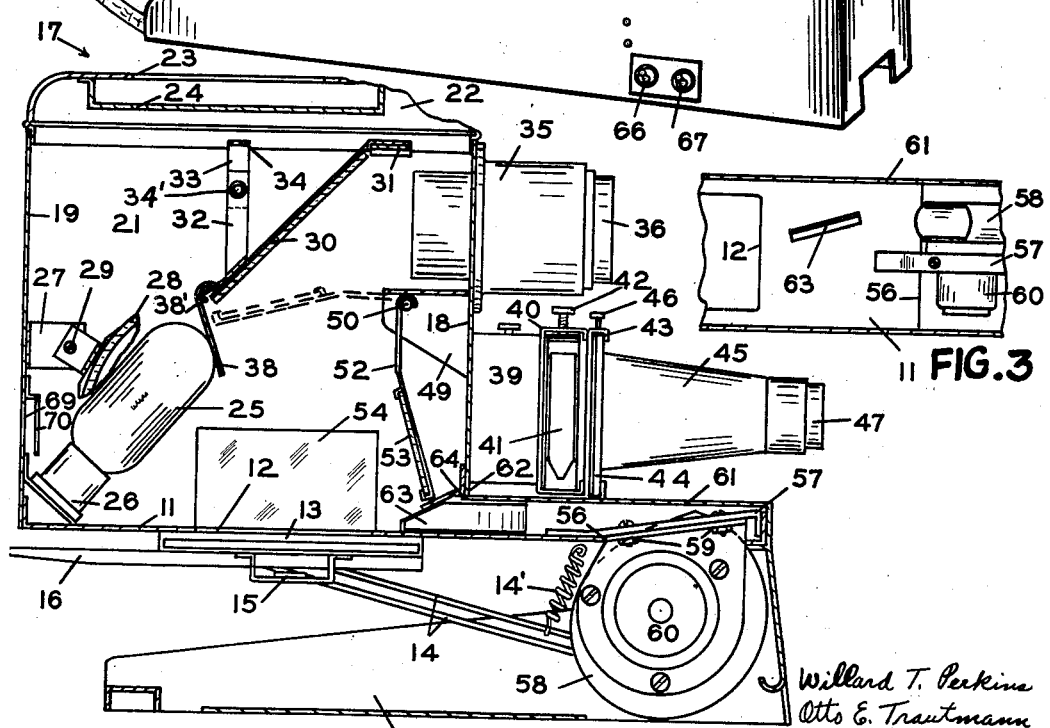
FIG. 2
FIG. 3
INVENTORS
Willard T. Perkins
Otto E. Trautmann
E. A. Ellestad
B. C. Diggins
BY
ATTORNEYS Patented May 14, 1940

2,200,637

UNITED STATES PATENT OFFICE 2,200,637

PROJECTOR

Willard T. Perkins and Otto E. Trautmann, Irondequoit, N. Y., assignors to Bausch & Lomb Optical Company, Rochester, N. Y., a corporation of New York Application May 11, 1939, Serial No. 273,066

2 Claims. (Cl. 88—26)

The present invention relates to projection apparatus and more particularly to a system for cooling such apparatus.

One of the objects of the present invention is to provide a projection apparatus which is simple, compact and efficient and which is maintained at a sufficiently low temperature to prevent injury to the objects to be projected. Another object is to provide an opaque projector in which cooling air is directed across the object to be projected and then deflected toward the projection light source. A further object is to provide a compact and efficient cooling system for an opaque projector. These and other objects and advantages reside in the novel features of construction, arrangement and combinations of parts as will be hereinafter set forth and pointed out.

In the drawing:

Fig. 1 is a perspective view of a projector embodying our invention.

Fig. 2 is a vertical section thereof.

Fig. 3 is a fragmentary plan view of the blower system with the cover removed.

Our invention is illustrated in connection with a projector of the type capable of projecting both opaque objects and transparencies. In the embodiment illustrated, 10 designates a hollow support or base which is high at the front and tapers down toward the back. A plate 11 is suitably secured at its front end to the front end of the support 10 and extends rearwardly above the support 10.

Near its rear end, the plate 11 is provided with a picture aperture 12 and an object holder 13 serves to support pictures or other opaque objects beneath the aperture 12. Two pairs of rods 14 are each pivotally connected at one end to the object holder 13 and at the other end to the hollow base 10. Each pair of rods 14 forms a parallelogram with the base 10 and object holder 13 so that the object holder remains always parallel to the plate 11. A bracket 15 secured to the object holder 13, forms a convenient actuating handle for lowering the object holder 13 to change pictures. The object holder 13 may also be provided with a rearward extension 16 which also serves as an operating handle. A suitable spring 14' fastened at one end to the base 10 and at the other to a rod 14 urges the object holder 13 upward against the plate 11.

A lamp housing 17 having a front wall 18, a rear wall 19 and side walls 20 and 21 is mounted on the plate 11 above the aperture 12. This lamp house 17 is closed by a top 22 which is provided with one or more ventilating openings 23. A baffle 24 secured in the top 22 beneath the openings 23 prevents the escape of light through the openings.

A source of light such as the incandescent lamp 25 is mounted in a suitable socket 26 fixed at the rear of the lamp house 17 alongside of the aperture 12. This lamp 25 is preferably tilted toward the aperture 12 as described in U. S. Patent 1,224,663 issued May 1, 1917 to W. L. Patterson. A bracket 27 is fixed to the rear wall 19 of the housing 17 behind the lamp 25 and a suitable reflector 28 is adjustably fastened on this bracket 27 by a screw or bolt 29.

Directly above the aperture 12 within the housing 17, is a mirror 30 which receives light from an object positioned at the aperture 12 and reflects it in a horizontal direction. This mirror 30 is secured at one end to a support 31 which extends across the top 22 from one side to the other. The rear end of the mirror 30 is supported by a bracket 32 which is connected to the depending portion 33 of a support 34 by a screw or bolt 34'. Like the support 31, the support 34 is fastened to the side walls of the top 22.

The front wall 18 of the housing 17 has an opening in alignment with the mirror 30, and a sleeve 35, carrying an objective 36 is secured over the opening by screws or bolts 37. This objective 36, receives the light reflected by the mirror 30 from an opaque object at the aperture 12 and forms an image of that object.

In order to prevent stray light from the lamp 25 from reaching the mirror 30 or objective 36, an opaque shield 38 is pivotally connected at 38' to the rear end of the mirror 30. This shield 38 swings up out of the way when the lamp 25 is to be removed and a fresh lamp inserted.

Below the objective 36 and in axial alignment with the filament of the lamp 25, the front wall 18 of the housing 17 has a second opening and a casing 39 is secured on the outside of the wall 18 over this second opening. This casing 39 may contain suitable condensing lenses, not shown. A guide 40 is fastened to the casing 39 and a slide carrier 41 for transparencies may be locked in the guide 40 by a suitable screw 42. A second guide 43, fixed on the front of the guide 40, slidably receives the flange 44 of a lens mount 45. A screw 46 threaded in the guide 43 serves to lock the lens mount 45 relative to the guide 43. An objective 47 is slidably mounted in the lens mount 45. The construction of the guide 43 and lens mount 45 permits the ready removal or application of a variety of lenses.

A bracket 49 is fixed to the front wall 18 within the housing 17 between the two openings. A shaft 50, rotatably journalled in this bracket 49, extends through the side wall 20 and is provided with an operating handle 51. Within the housing 17, the shaft 50 carries an opaque plate 52 which, when in the full line position shown in Fig. 2, prevents light from the lamp 25 from reaching the condensing lenses in the casing 39 and the device is adapted to project only images of opaque objects positioned at the aperture 12. When the plate 52 is raised to its dotted position by means of the handle 51 and shaft 50, light from the lamp 25 goes into the condenser casing 39 and the plate 52 masks the mirror 30. In this position, the projector can project only transparencies.

In order to increase the illumination on an opaque object, a reflector 53 may be mounted on the plate 52 and other reflectors 54 may be mounted alongside of the aperture 12.

The plate 11 has an opening 56 adjacent its front end and a support 57 is attached to the plate 11 across this opening. A suitable fan or blower 58 is secured to the support 57 beneath the opening 56 and within the base 10 by bolts 59. This blower may be driven by a suitable motor 60. A cap or cover 61 extends from the front end of the plate 11 over the opening 56 and beneath the guides 40 and 43 and condenser casing 39 to an opening 62 in the front wall 18 of the housing 17. This cover 61 forms a conduit conducting air from the blower 58 into the housing 17 toward the aperture 12.

Due to the motor 60, the blower 58 is positioned toward one side of the opening 56 and a baffle plate 63 fixed on the plate 11 deflects a part of the air from the blower 58 so that the air spreads across the width of the aperture 12. A deflecting plate 64 is fastened to the wall 18 just above the opening 62 and directs the air downward toward the aperture 12.

In operation, power is furnished through a cord 65 and switches 66 and 67 serve to connect the lamp 25 and motor 60, respectively, to the source of power. The blower 58 draws air through an opening, not shown, in the side wall of the base 10 and blows this air through the conduit formed by the cap 61 into the housing 17. The two plates 63 and 64 direct the air downward across the aperture 12. An opaque picture or other object held against the aperture 12 by the object holder 13 deflects the air upward past the lamp 25. The air thus cools the bottom wall 11, the opaque object and the lamp 25. After it passes the lamp 25, the heated air leaves the housing 17 through an opening 69 in the rear wall 19 or through the openings 23 in the top 22. A baffle 70 prevents the escape of stray light through the opening 69.

Access to the interior of the housing 17 may be had through a door 71 attached to the wall 20 by a hinge 72. This door 71 is normally held closed by a suitable latch under the control of a handle 73. If desired, ventilating openings 74 may be provided in the door 71.

From the foregoing, it will be apparent that we are able to attain the objects of our invention and provide a projector for projecting opaque or transparent objects in which both the projector and objects are simply yet effectively protected against excessive heat. Various modifications can, of course, be made without departing from the spirit of our invention or the scope of the appended claims.

We claim:

1. A projection apparatus comprising a support, a base plate carried by said support, said plate having two spaced apertures therethrough, a blower mounted beneath said plate adjacent one aperture for blowing air through said one aperture, a conduit mounted above said one aperture for directing air from said blower toward the other aperture, means for supporting an object to be projected beneath said other aperture, a housing carried by said plate above said other aperture, a source of light within said housing for illuminating an object at said other aperture, and means carried by said housing for projecting an image of an object at said other aperture.

2. A projection apparatus comprising a hollow support, a flat plate secured at its front end to said support and extending rearwardly above said support, said plate having a ventilating aperture adjacent its front end and a picture aperture adjacent its rear end, a blower mounted within said support beneath said plate adjacent the ventilating aperture for blowing air through said ventilating aperture, a conduit mounted on top of said plate for directing air from said blower rearwardly toward the picture aperture, a housing provided with ventilating openings adjacent its top mounted on said plate above said picture aperture, a lamp secured in said housing at the rear of said picture aperture for illuminating an object at said picture aperture, means for deflecting air from said conduit downward toward said picture aperture, a lens carried by said housing above said conduit, and means for directing light from an object at said picture aperture to said lens.

WILLARD T. PERKINS.
OTTO E. TRAUTMANN.